June 5, 1928. 1,672,135
C. PRIDDY
BREATHER PIPE ATTACHMENT
Filed Aug. 2, 1927
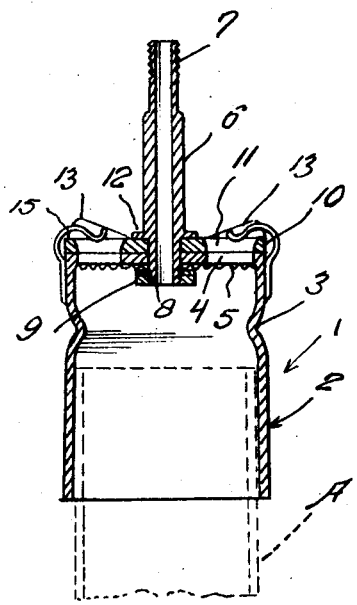
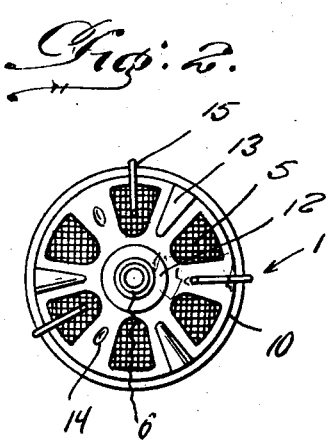
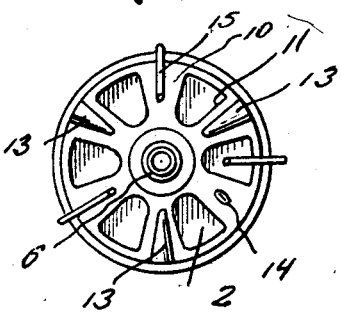
Inventor
Charles Priddy,
By Clarence A. O'Brien
Attorney Patented June 5, 1928.

1,672,135

UNITED STATES PATENT OFFICE.

CHARLES PRIDDY, OF McALESTER, OKLAHOMA.

BREATHER-PIPE ATTACHMENT.

Application filed August 2, 1927. Serial No. 210,151.

This invention relates to an improved device which may be conveniently defined as an attachment for a breather pipe, the same having more particular reference to a device which is adapted to replace the usual breather pipe cap in order to permit an air hose to be connected therewith with a view toward utilizing air pressure for assisting in draining the oil from the crank case.

Briefly, the invention comprises a cap to fit onto the pipe, this cap being provided with screened openings and these being controlled by a rotary valve. In addition, it includes a short pipe connection for permitting the hose to be connected thereto, together with resilient means for maintaining the valve in adjusted position.

My principal aim is to provide an exceptionally simple and inexpensive device for the purpose specified, the same being of such construction that it will serve under ordinary conditions in place of the usual cap, but may be readily converted to permit the air holes to be closed in order that the hose may be connected thereto for injecting a current of air into the oil laden crank case.

Other objects and advantages of the invention will become apparent from the following description and drawing.

In the accompanying drawing forming a part of this application and in which like numerals are employed to designate like parts throughout the same:

Figure 1 is a sectional view of a device constructed in accordance with the present invention showing the approximate manner in which the same is used.

Figure 2 is a top plan view of Figure 1 wherein the valve is shown as open.

Figure 3 is also a top plan view with the valve closed.

Referring to the drawings in detail it will be seen that the reference character A designates the usual breather pipe, while the reference character 1 designates generally the entire attachment. As before stated, this attachment comprises a cap 2 which is adapted to fit telescopically on the open end of the breather pipe. It will be noted that this cap is bent between its ends to provide a circumferential bead 3 which constitutes a stop. Moreover, the cap is provided with air intake holes 4 and a screen 5 is employed to cover these to prevent the entrance of particles of dust. The reference character 6 designates a short pipe connecting member or coupling having a screw threaded end 7 for connection of the air hose (not shown). In addition, it is provided with a reduced screw threaded end portion 8 extending through an opening in the center of the top of the cap and a retaining nut is threaded on this. Rotatably contacting the top of the cap and surrounding the reduced end portion of the pipe 6 is a disk 10 which is also provided with openings 11 adapted to register with the openings 4 to control the entrance of air or to cut it off completely as desired. It will be noticed that this disc is confined by an outstanding flange 13 on the pipe 6 and that it is provided with upstanding lugs 13 constituting finger pieces by means of which the valve may be conveniently regulated. Then too small seats 14 are formed in the webs as shown plainly in Figures 2 and 3. Finally, I employ a plurality of circumferentially spaced spring clips 15 attached to the part 1 and having curved free end portions constructed to snap into one of the seats 14.

From the foregoing description and drawing it will be seen that I have evolved and produced a novel contrivance capable of replacing the ordinary breather pipe without requiring alterations in the breather pipe construction. The gist of the idea resides in the construction whereby air can be supplied as is usual through the new contrivance, or the latter can be closed entirely to cut off the air temporarily while an air pressure supply hose is connected to the contrivance for forcing a current of air downwardly through the breather pipe to assist in draining oil from the crank case. The details and their relative arrangement and association will be plain to those skilled in the art to which the invention relates, for this reason a more lengthy description is thought unnecessary.

While the preferred embodiment of the invention has been shown and described, it is to be understood that minor changes coming within the field of invention claimed may be resorted to if desired.

Having thus described the invention, what I claim as new and desire to secure by Letters Patent is:—

1. As a new article of manufacture, a breather pipe attachment comprising a cap adapted to fit over the open end of the breather pipe, said cap being provided with air holes, a valve for controlling said holes, and means whereby an air supply hose may be connected with said cap for introducing air under pressure into the breather pipe when the valve is closed.

2. As a new article of manufacture, a breather pipe attachment of the class described comprising a cap adapted to fit telescopically on the open end of a breather pipe, said cap being provided in its upper end with screened openings, a rotary disc valve associated with said cap and said openings, said valve being provided with operating lugs and the web portions being formed with seats, and spring clips carried by said cap and cooperable with said seats for maintaining the valve in adjusted positions.

CHARLES PRIDDY.